United States Patent
Gerou

(10) Patent No.: US 6,227,576 B1
(45) Date of Patent: *May 8, 2001

(54) COLUMN WRITING FOR FAST AND SUPER FAST READING

(76) Inventor: George Gerou, 24, Valtinon Str., Athens (GR), 114 73

( * ) Notice: Subject to any disclaimer, the term of this patent is extended or adjusted under 35 U.S.C. 154(b) by 0 days.

This patent is subject to a terminal disclaimer.

(21) Appl. No.: 08/146,121

(22) PCT Filed: Mar. 11, 1993

(86) PCT No.: PCT/GR93/00006

§ 371 Date: May 16, 1994

§ 102(e) Date: May 16, 1994

(87) PCT Pub. No.: WO93/18635

PCT Pub. Date: Sep. 30, 1993

(51) Int. Cl.⁷ .................................................. G09B 17/02
(52) U.S. Cl. ................. 285/46; 283/67; 283/45; 434/179
(58) Field of Search ................... 283/46, 40, 42, 283/72, 45; 434/167, 178, 179

(56) References Cited

U.S. PATENT DOCUMENTS

| | | | |
|---|---|---|---|
| 3,871,115 | * 3/1975 | Glass et al. ........................ | 283/46 X |
| 4,643,450 | * 2/1987 | Morris .............................. | 283/46 X |
| 4,655,713 | * 4/1987 | Weiss ............................... | 283/46 X |
| 4,795,348 | * 1/1989 | Garthwaite ........................ | 283/46 X |

* cited by examiner

Primary Examiner—Willmon Fridie, Jr.

(57) ABSTRACT

The present invention relates to a reading system and method for printing texts for a more comfortable, faster and even superfast reading and for the facilitation of acquiring reading skills for very young pupils, in which the printed pages of the texts have one or more columns of individual isolated words. The individual isolated words which constitute each column run vertical to the straight ideal axis of said column and the beginning and the end of each word are as symmetrical as possible to said ideal axis which thusly runs through the middle of each word. The words can then be read in a perpendicular fashion, from top to bottom. As the length of each words is within the visual angle of the reader's eye, the system of the invention directs the reader's eye in following the ideal axis while reading without shifting the eyes from one side to the other, thusly rendering the reading of each column much more comfortable as well as faster than that of other types of printed texts.

2 Claims, 3 Drawing Sheets

DRAWING

His
9 → friend
was
an
American
born
10 and
raised
in
New
York ½
and ½
14 consequently
very
proud
of
his
native
city.
He
just
couldn't
wait
to
take
his
½ friend ½
15 out
and
show
his
city
to
him.
On
their
first
day
of
sightseeing,
12

FIG. 2

His
friend
was
an
American  13
born
and
raised
in
New
York
and
consequently
very
proud
of
his
native
city.
He
just
couldn't
wait
to
take
his
friend
out
and
show
his
city
to
him.
On
their
first
day
of
sightseeing,

| A-B | C-D | E-F | H-I |
|---|---|---|---|
| axis of symmetry | axis of symmetry | axis of symmetry | axis of symmetry |
| His | His | His | His |
| friend | friend | friend | friend |
| was | was | was | was |
| an | an | an | an |
| American | American | American | American |
| born | born | born | born |
| and | and | and | and |
| raised | raised | raised | raised |
| in | in | in | in |
| New | New | New | New |
| York | York | York | York |
| and | and | and | and |
| consequently | consequently | consequently | consequently |
| very | very | very | very |
| proud | proud | proud | proud |
| of | of | of | of |
| his | his | his | his |
| native | native | native | native |
| city. | city. | city. | city. |
| He | He | He | He |
| just | just | just | just |
| couldn't | couldn't | couldn't | couldn't |
| wait | wait | wait | wait |
| to | to | to | to |
| take | take | take | take |
| his | his | his | his |
| friend | friend | friend | friend |
| out | out | out | out |
| and | and | and | and |
| show | show | show | show |
| his | his | his | his |
| city | city | city | city |
| to | to | to | to |
| him. | him. | him. | him. |
| On | On | On | On |
| their | their | their | their |
| first | first | first | first |
| day | day | day | day |
| of | of | of | of |
| sightseeing, | sightseeing, | sightseeing, | sightseeing, |
| sets of printing elements Fig. a | sets of printing elements Fig. a' | The produced text in column Fig. b | The produced text in column Fig. b' |

Once an Englishman went to New York to visit a friend of his. His friend was an American born and raised in New York and consequently very proud of his native city. He just couldn't wait to take his friend out and show his city to him. On their first day of sightseeing, the American pointed out a lot of interesting sights hoping to impress his friend, but the Englishman seemed quite unimpressed.

FIG. 5

COLUMN WRITING FOR FAST AND SUPER FAST READING

BACKGROUND OF THE INVENTION

The present invention relates to a reading system and process for printing and reading texts, and especially to a system using columns of words and scan words.

Due to the ease of acquiring information via the electronic communication media (radio, TV, computer nets, etc.) many people have limited or even completely canceled the time they spend on reading texts. This decision of theirs can be also accredited to the inherent difficulties present in the process of reading which is tiring and time consuming.

The improvement of the mass media attracts huge amounts of capital whereas only few scholars carry out research into the improvement of reading, and then without government funding. This work intends to obviate or limit even some of the disadvantages the reading of conventional texts presents; disadvantages such as, for instance, the more than necessary fatigue required, the low speed of reading as well as the difficulty in understanding certain texts.

As has become apparent by experimentation with readers as well by the use of the first educational book in Greek, writing in column succeeds in increasing the reading speed and in reducing the fatigue by introducing a rectilinear motion of the eye during the reading process. Furthermore, it facilitates the learning process of reading and a more extensive comprehension of school books, in general.

There are many techniques used for teaching speed reading and others for helping younger pupils in learning how to read easier and in better understanding their lessons. It is the object of the present invention to facilitate the reader, not only so as to read faster but to read even more faster when reading the distinct selected words which convey a summary of the text, and to do so with the least possible effort.

As the usual length of a word is within the visual field of the reader without a shifting of the eyes from one side to the other being necessary for the reading process.

The object of fast, superfast but less tiring reading is achieved according to the present invention by the feature that during the reading process the eyes of the reader follow the straight ideal axis of each column. Thus, the reading becomes faster and more comfortable as the eyes of the reader are not obliged to shifting one side to the other, and in doing so to tire the eyes as well as the brain which in turn sends all the necessary numerous orders for the shifting of the reader's eyes.

The technique of the present invention further facilitates the understanding of the text since every word appears almost alone in the visual field of the reader who is thusly given the opportunity to study each and every word individually and in doing so to obtain more conceptual data.

Moreover, the possibility which is offered to the reader to have a summary of the text by reading just the scan words, can be very expeditious for pupils in learning their lessons.

The above characteristics make the technique of the invention very useful for printing school books.

Experimentation has shown that texts written by this technique allow readers to read fast and superfast but to also comprehend better the text they are reading.

Prior art U.S. Patent which utilizes techniques for fast reading and scanning may be seen in the U.S. Pat. No. 4,643,450 awarded to Max F. Morris in which the printed lines have as a common beginning the scan bar and each line has more words than one. But also the scan words, as can be seen in the drawing, are scattered in the various lines of the text. The present invention constitutes an important progress in relation to the prior art patent for the following reasons:

(a) According to the present invention in each line of the column of words there is only one word the length of which is within the visual field of the reader and which can be read by the reader without shifting the eyes from one side to the other. As a result the course of the reader's glance is in perfect alignment with the ideal axis of symmetry of the column. Thus, the reading becomes faster and more comfortable as the eyes of the reader are not obliged to shifting one side to the other, and in doing so to tire the eyes as well as the brain which in turn sends all the necessary numerous orders for the shifting of the reader's eyes. On the other hand, in the prior art U.S. Pat. No. 4,643,450, in each line there is an entire line of words which, as they are not within the visual field of the reader requires a shifting of the eyes and as reported in U.S. Pat. No. 4,643,450 p. 2 1. 47 "to read the material shown in the figure, a reader learns to read each entire line rather than the individual words".

(b) According to the present invention the superfast reading is ensured by the feature of selective reading, because the scan words can be easier found as they are rectilinear to the axis of symmetry of each column. On the other hand, in U.S. Pat. No. 4,643,450 the scan words are clearly more difficult to be found as they are scattered.

Another prior art U.S. Patent relating to a method of printing may be seen in U.S. Pat. No. 4,655,713 awarded to Martin M. Weiss in which the writting is done not simply with letters of the alphabet but with combinations of letters of different types and additional symbols aiming at the teaching of proper pronunciation.

SUMMARY OF THE INVENTION

The present invention relates to a reading system in which the arrangement of the words is done in columns. Each line of each column contains only one word the direction of which is perpendicular to an ideal axis of the column running from the top of the page to the bottom. This axis runs through the middle of the words. The beginning and the end of each word are symmetrical to this axis. As the length of each words is within the visual angle of the reader's eyes, it is not necessary for the reader to shift the eyes from one side to the other during the reading of each word. Thusly, during the reading process, which is conducted from top to bottom, the eyes of the reader run rectilinearly on the axis of symmetry of the column he/she is reading, that is without having to turn his/her eyes right or left. This way the reading process becomes more comfortable and faster and the understanding of the text easier and more extensive.

The selected words of the text which convey the main premises of the text or its summary are usually printed in darker lettering than the rest, or in different letter type, or have a background colour, so as the scan words to be read selectively.

BRIEF DESCRIPTION OF THE DRAWINGS

Other objects, features and advantages of the present invention will be apparent from the written description and the drawings in which the drawing is a sample of printed text in accordance with the present invention. These show:

FIGS. 1 and 2: are columns of individual words whose beginning and end are symmetrical to the ideal axis.

FIG. 5: horizontal rows of words with scan words.

DESCRIPTION OF THE PREFERRED EMBODIMENTS

Figures 3, 4:
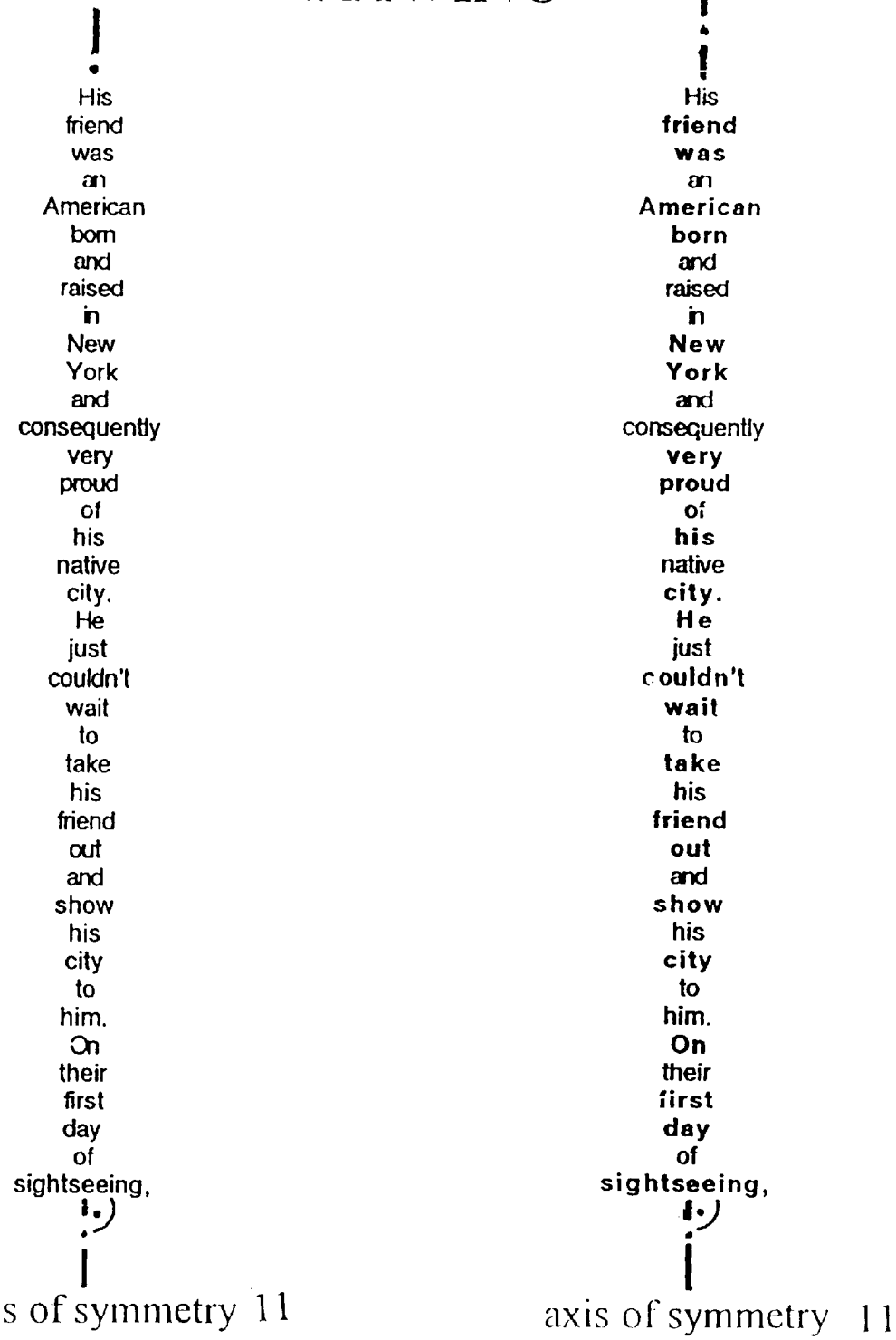
FIGS. 3 and 4: are column as in FIG. A with scan words.

With reference to the drawing a sample of text using the present reading system and process is illustrated, in which each page has one or more columns made up of individual words, in which said words are vertical to an ideal axis running vertical on the page. Said axis runs through the middle of each word and thusly the beginning and the end of said words are symmetrical to one another and to said ideal axis. Said axis is shown in the drawing so as to indicate the rectilinear course of the eye during the reading process. In the conventional texts there is no need for this to be shown and therefore it is not.

Since the length of each words is within the visual angle of the reader's eye, the reader can read every word of the column without shifting the eyes from one side to the other, as the case is when reading a text where the words are arranged in lines.

Certain selected words are printed in darker lettering than the rest, or in different font, or have a background colour, so as to stand out from the rest of the words in the text and so as to be read selectively. The reading of these selected words, which may convey the summary of the text, a superfast reading of the text is achieved.

It is obvious that the present invention relates to the printing of every kind of book, newspaper, magazine or electronic medium which is created so as to allow its fast or superfast reading by the reader.

What is claimed is:

1. Method of text production wherein the words of the texts are printed or produced in columns by any form of installation, characterized by:

each printing element forming a word wherein the produced text has only one word per line.

arranging the set of printing elements of each word under the set of printing elements of the previous one in such a way that the produced text consists of columns of words, which are read from top to bottom of the column, and arranging the printing elements of each word on successive lines in such a way that the first and the last character of each word are symmetrical with respect to a single symmetry axis for every column, while this axis is vertical to direction of the length of the word.

2. Method of text production using the method of column writing according to claim 1, characterized by the fact that the characters of some sets of printing elements are produced in a different ink color or different background or different fonts on order to achieve selective and quick reading of the text.

* * * * *